United States Patent
Hansen et al.

(12) 
(10) Patent No.: US 6,546,754 B1
(45) Date of Patent: Apr. 15, 2003

(54) APPARATUS FOR SILICA CRUCIBLE MANUFACTURE

(75) Inventors: Richard L. Hansen, Mentor, OH (US); Fred D'Orazio, Kirtland, OH (US); Victor Lou, Schenectady, NY (US); George Coleman, Heath, OH (US)

(73) Assignee: General Electric Company, Pittsfield, MA (US)

( * ) Notice: Subject to any disclaimer, the term of this patent is extended or adjusted under 35 U.S.C. 154(b) by 341 days.

(21) Appl. No.: 09/698,415

(22) Filed: Oct. 27, 2000

(51) Int. Cl.[7] .............................................. C03B 20/00
(52) U.S. Cl. ........................................ 65/144; 65/302
(58) Field of Search ................................ 65/17.3, 17.4, 65/17.5, 17.6, 144, 157, 158, 302; 425/425

(56) References Cited

U.S. PATENT DOCUMENTS

| | | | | |
|---|---|---|---|---|
| 4,632,686 A | * | 12/1986 | Brown et al. | 65/17.3 |
| 4,935,046 A | * | 6/1990 | Uchikawa et al. | 65/17.4 |
| 5,015,279 A | * | 5/1991 | Guibert et al. | 65/302 |
| 5,350,433 A | * | 9/1994 | Baniel | 65/388 |
| 5,913,975 A | | 6/1999 | Holder | 117/900 |

FOREIGN PATENT DOCUMENTS

| | | | |
|---|---|---|---|
| EP | 0693461 A1 | | 1/1996 |
| JP | 01157428 | | 6/1989 |
| JP | 4-310530 | * | 11/1992 |
| JP | 10017391 | | 1/1998 |
| JP | 11199369 | | 7/1999 |
| JP | 2000072458 | | 3/2000 |

* cited by examiner

Primary Examiner—Sean Vincent

(57) ABSTRACT

An apparatus for manufacture of quartz crucibles comprising a hollow mold having a bottom wall portion and a side wall portion and defining a hollow space therein. The walls of the mold include a plurality of openings to facilitate gas passage therethrough. A rotatable support of the mold is provided to rotate the mold about a vertical axis. A vacuum is applied through the walls of the mold to draw quartz particles against the walls and remove gas. A shroud surrounds at least a portion of the hollow mold; at least one gas inlet positioned to provide a gas to a space between the shroud and the mold. A housing overlaps at least a portion of the shroud and the hollow mold. At least one gas outlet is positioned to exhaust gas which may exit the space between the shroud and the mold. Alternatively, or in addition to the outlet, a space may be provided between the housing (hood) and the shroud to facilitate gas discharge. In manufacturing a crucible in this apparatus, the gas flow can be balanced so the in-flow rate of control gas is in excess of the exhaust rate from the controlled atmosphere via the outlet or space.

14 Claims, 1 Drawing Sheet

APPARATUS FOR SILICA CRUCIBLE MANUFACTURE

BACKGROUND OF THE INVENTION

The present invention is directed to quartz (alternatively referred to as silica) crucibles and more specifically to an apparatus for forming fused quartz crucibles used in the semiconductor industry for growing single crystal silicon articles.

In the production of silicon crystals, the Czochralski method is often employed where polycrystalline silicon is first melted down within a quartz crucible. After the polycrystalline silicon has melted, a seed crystal is dipped into the melt and subsequently extracted while the crucible is rotated to form a single crystal silicon ingot.

It is important that the crucibles used for preparing single crystal silicon, particularly for the semiconductor industry, be essentially free of impurities. In addition, the quartz crucible is preferably largely free of included bubbles and other structural imperfections.

Accordingly, it is highly desirable to have available a method for forming silica crucibles having a low bubble content and/or bubbles containing gasses having little or no negative effect on silicon crystal growth.

Traditionally, to prepare such crucibles, a raw material quartz is introduced into a rotating hollow mold which has gas pervious wall regions at the side and bottom. After introducing the raw quartz material, a heat source is introduced into the mold to melt the quartz. During heating, a vacuum is applied to the outside of the rotating mold to draw out interstitial gases. Although this process reduces bubble content, bubbles nonetheless remain. Moreover, while attempts have been made to control the atmosphere, satisfactory apparatus do not exist to adequately meet the unique requirements of quartz crucible manufacture.

Therefore, a need still exists in the semiconductor industry for a crucible with a low bubble content and/or crucible having bubbles containing gases with little destructive effect on the polycrystalline melt and the drawn crystal. This can be accomplished by reducing the number of bubbles and by controlling the composition of the gas trapped in the bubbles to reduce impact on crystal growth. Moreover, the composition of the gas in the bubbles can be controlled such that the included gas is highly soluble in the silicon melt or evolves therefrom. One important requirement to achieve this goal is the availability of an apparatus for crucible manufacture which facilitates production of crucibles with reduced bubble count and with controlled bubble gas composition.

SUMMARY OF THE INVENTION

According to an exemplary embodiment of this invention, an apparatus for manufacture of quartz crucibles is provided. The apparatus includes a hollow mold having a bottom wall portion and a side wall portion defining a hollow space therein. The walls include a plurality of passages which facilitate drawing gas through the walls of the mold under vacuum. This feature thereby draws the quartz particles against the walls and removes gas.

A rotatable support for the mold is also provided to facilitate rotation of the mold about a vertical axis. This feature also serves to enable the retention of the quartz sand on the walls of the mold via centrifugal forces.

A shroud surrounds at least a portion of the hollow mold and at least one gas inlet is provided to supply a gas to a space between the shroud and the mold. Generally, the shroud will surround the outer bottom and side walls of the mold and the outer periphery of a top of the hollow mold.

A housing, or a hood, surrounds at least a portion of the shroud and the mold, the housing having at least one gas outlet positioned to exhaust gas. Preferably, the housing will establish a crucible formation environment which is either a) sealed from the surrounding atmosphere or b) created with sufficiently close tolerances (e.g. a hood) that by maintaining a desired flow into the environment, a positive pressure relative to outside air is maintained. This ensures that there is control gas flowing out, and no surrounding atmosphere flowing into the housing.

Preferably, a compressed air source is provided in connection with the vacuum system to expose the openings in the mold to a reverse pressure to permit ejection of crucibles after melting and sintering.

Preferably, a rotary vacuum connection joint is used to couple a vacuum line to the hollow mold to permit rotation of the mold.

DETAILED DESCRIPTION OF THE PREFERRED EMBODIMENT

Figure 1:
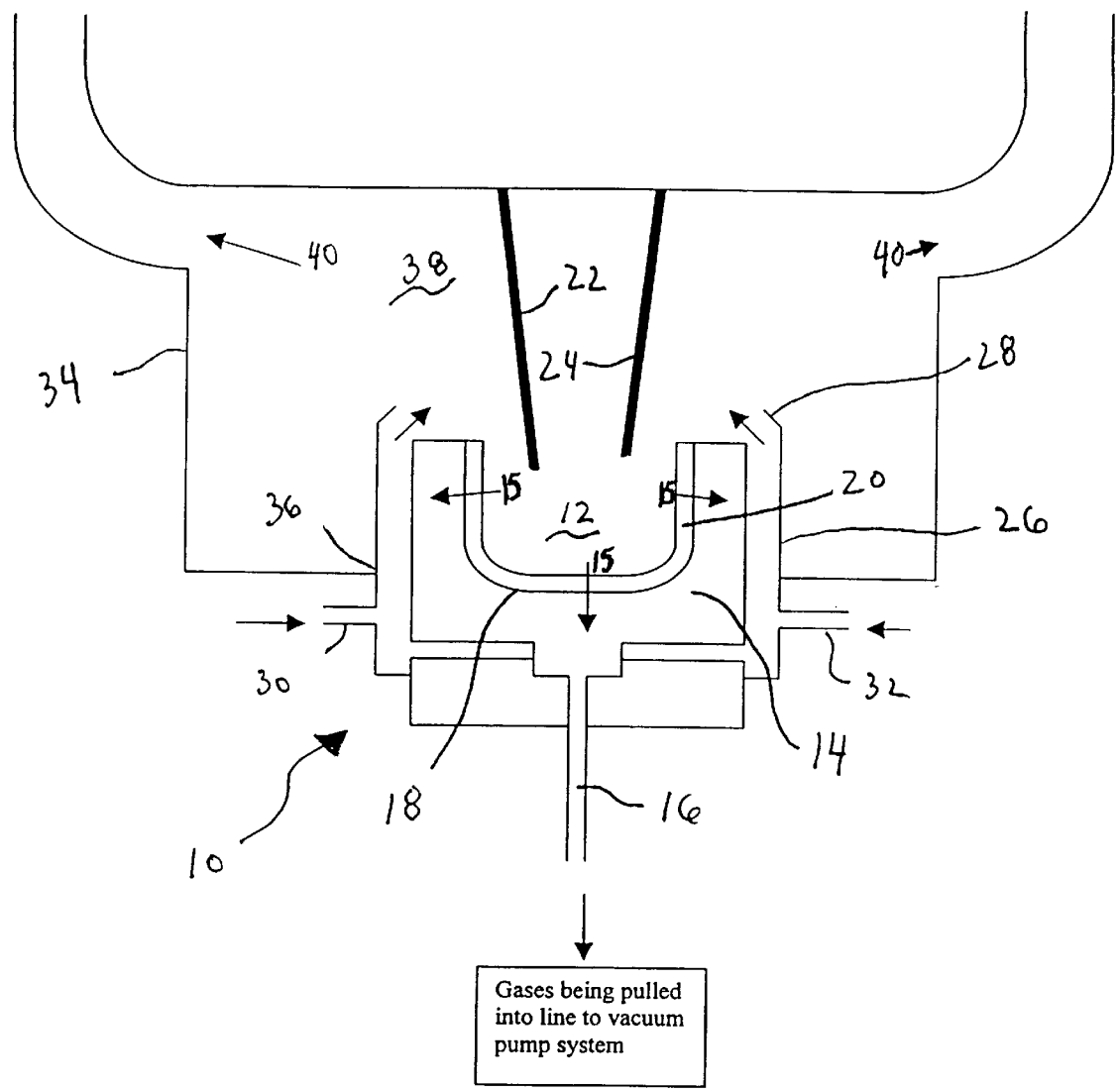
FIG. 1 is a schematic view of an apparatus for producing a crucible in accord with the present invention.

Fused quartz crucibles are used by the semiconductor industry for growing single crystal silicon ingots from polycrystalline silicon according to the Czochralski Process. In conducting the process, polycrystalline silicon is placed in a quartz crucible and melted at about 1500° C. The resulting melt is touched with a seed crystal. As it is pulled out, a single crystal silicon ingot grows.

During ingot growth, the molten silicon reacts with the fused quartz crucible, dissolving part of the crucible wall. If the crucible wall which dissolves contains bubbles, the dissolution process can cause the material surrounding the bubble to fragment. In so doing, fine chips of fragments of fused quartz may be released. Fragments which break off may cause multiple growth cites and upset the equilibrium of the crystal growth process, thus limiting the crystal growing yield. In addition, any gas contained within the bubble will be dissolved in the drawn silicon, or if insoluble, may become entrained therein. Accordingly, it is desirable to control the quantity, size and gas content of crucible bubbles.

The crucible itself is formed by placing quartz sand in a rotating graphite pot. Centrifugal forces cause the sand to "cling" to the sides of the pot, taking on the shape of a bowl. An electric arc supplies heat to melt the sand. When the arc is inserted, the temperature at the arc is about 6000° C., and the temperature at the wall is about 2000° C. A series of openings at the bottom of the graphite pot supply a vacuum to remove residual gases from the sand.

Not all gases between the sand grains are removed by the vacuum. Moreover, the spaces between the sand grains will retain some residual gas even at the available vacuum levels. In addition, the sand grains typically fuse together quickly, trapping gases in the voids. The gases roughly parallel the composition of the surrounding atmosphere. Previously, poor control of the surrounding atmosphere has been maintained during the fusion process. Similarly, earlier crucible forming apparatus did not allow for effective monitoring and modification of the surrounding atmosphere By fusing crucibles in an atmosphere with a reduced amount of undesirable gases, the number of bubbles can be reduced and the bubbles which form in the crucible voids can have a reduced content of undesirable gases. Thus, when fewer and smaller bubbles are released into the melt as the crucible dissolves during crystal growth, void defects in the crystal caused by undesirable gases are minimized or eliminated. In accordance with the present invention, it has been found that control of the crucible fusion atmosphere requires a particular apparatus to advantageously and economically control the crucible fusion process.

Referring to FIG. 1 there is shown an apparatus 10 for producing quartz crucibles. Apparatus 10 includes a fusion atmosphere 12. A rotatable mold 14 is provided with a rotating shaft 16. Rotating shaft 16 is preferably hollow or otherwise equipped with a vacuum line in communication with mold 14 to facilitate drawing fusion atmosphere 12 through the walls of mold 14. Moreover, mold 14 is provided with passages (not shown) but generally indicated by arrows 15. In the mold 14, there is a cavity 18 for forming a crucible 20. The mold 14 is rotated and heat sources 22 and 24 (electric arc) produce a high temperature atmosphere in the mold 14. A quartz powder is supplied to the cavity 18 through a feed (not shown) but disposed above the mold 14. The quartz powder is deposited on the inner surface of the mold 14, and fused to form crucible 20 with heat from heat sources 22 and 24.

The mold 14 may be provided with a cooling mechanism of a conventional type. The configuration and the size of the mold 14 may be approximately determined depending on the configuration and the size of the crucible to be produced. The mold 14 is made of a material having a satisfactory heat resistance and mechanical strength.

The fusion gas atmosphere 12 inside the mold 14 is highly controlled. Particularly, a shroud 26 is provided which surrounds the bottom and sides of mold 14. In addition, shroud 26 includes shoulder 28 which helps to direct a gas entering via inlet conduits 30, 32 into atmosphere 12.

Shroud 26 is itself partially surrounded by housing 34. Housing 34 forms a gas tight (or at least positive pressure) seal 36 with shroud 26 to establish a controlled atmosphere 38. Housing 34 also includes exhaust vents 40. Gas as directed from shoulder 28 and from atmosphere 38 can enter the mold 14 to form a desired fusion atmosphere 12. Advantageously, the gas is not directly injected into atmosphere 12, which can negatively impact the heating currents and/or the walls of the developing crucible.

By providing the shroud with a set of gas inlet pipes and a preferably cylindrical shroud body around the rotating pot that is at least substantially sealed around the perimeter at its bottom edge, an appropriate gas atmosphere can be designed. The gas comes in the inlet piping and goes into the space between the cylindrical shroud body and the rotating mold. This space acts like a plenum and allows the gas to come in at a reduced velocity. Moreover, the gas can flow relatively slowly as it works its way toward the top edge of the pot and toward the open mouth of the crucible. It is desirable to have high volume flow but at low linear velocities. Moreover, a flow as a high velocity jet may disrupt the normal flow patterns in and around the high power electric arc. Nonetheless, the flow into the volume over the top of the mold is preferably more than the sum of all the out-flows from that same volume.

The gas choices may include, but are not limited to helium, hydrogen, oxygen, nitrogen, neon, argon, krypton, xenon, and of lesser desirability, fluorine, chlorine, bromine, radon, carbon monoxide, carbon dioxide and water vapor. The choices also include, but are not limited to mixtures of the above like: binary mixtures such a helium plus oxygen, helium plus nitrogen, nitrogen plus oxygen, helium plus neon, ternary mixtures such as helium plus oxygen plus nitrogen, neon plus oxygen plus nitrogen, etc.

The fact that there is vacuum system behind the sand bed causes a negative pressure in the pot. The control gas is pulled down into pot and then through the sand bed causing a negative pressure in the pot. The vacuum is preferably less than 75,000 Pa, more preferably less than 15,000 Pa, and most preferably, less than 5,000 Pa.

It is desirable that all out-flows from this region be controlled so that the in-flow is greater than all of the out-flows. This ensures that the area will be at a positive pressure and thus be more capable of establishing a controlled volume of the desired gas stoichiometry. Having passed through the sand bed it exhausts into the graphite mold and is pulled down the vacuum line toward the vacuum pumps.

The piping just on the vacuum pump side of the fusion pot exhaust makes a preferred location to monitor gas composition. For example, a gas spectrometer can be used in this location. Moreover, at that location, the gas composition that has actually been pulled through the sand bed can be monitored. As the control gas is pulled into the sand bed, it starts to replace the normal ambient air and if a gas that is different than air is used, the gradual change from air composition to that of the selected gas composition can be monitored. This atmosphere conversion can take anywhere from a few minutes to several depending on vacuum pumping rate, source flow rate and other flow rates. When all factors are satisfied, pure nitrogen, for example, can replace air in about 1 to 1.5 minutes, with the remnants of normal air being less than 10% to less than 2% of what remains within about 2 to 3 minutes. Because the gas from the controlled atmosphere is pulled into and through the sand bed, one can control the gas that is in the interstices between the sand grains by gaining control over the controlled air volume which is the feed supply to the gas in the sand bed.

Preferably, all of the pertinent in-flows and out-flows are balanced. Moreover, the incoming gas flow is preferably in excess of the vacuum pumping flow rate and the hood exhaust rate. This establishes the desirable positive pressure area of the desired control gas above the pot opening.

Preferably, a well sealed hood configuration is used over the fusion pot. A hood that is not well sealed shows a much slower transition to the controlled atmosphere and does not reach the same ultimate values.

Once the desired level of control of the atmosphere is gained, the arc is struck and power is supplied to the arc to cause the sand bed to heat up and begin to melt. Once the inner surface of the sand bed starts to melt, it starts to provide a seal against the continued flow of gas.

In addition, the present apparatus reduces patches of vapor deposits on the inside surface of the crucible. Moreover, prior use of atmosphere controlling gas via jets disrupted the surface of the forming crucible by forming vapor spots. By providing gas space confinement and relatively low rate gas flow the present device reduces vapor spots.

In addition to the arc effects, the diffusion capability of the gases can be controlled by picking gases that are known to have high diffusivity. This could enable the vacuum system to be more effective at reducing the bubble density of the crucible in specific targeted regions.

By controlling the atmosphere around fusion, at least the following advantages can be gained.

1. Seasonal variations in air temperature and humidity can be eliminated.
2. The electric arc can be properly maintained. The plasma chemistry of the gas present can be chosen. Nitrogen, or mostly nitrogen is known to suppress arcs. Other gases like argon or helium enhance the arc stability by virtue of their lower first ionization potentials. Accordingly, the arc atmosphere can be rapidly tailored as necessary.
3. The mobility (diffusivity) of the gas mixture can be chosen. Since the gas or gases are being pulled through a porous sand bed, gases which have higher mobility through the sand bed are more likely to result in a fused bed with lower bubble density for any given set of conditions and perhaps smaller bubble sizes (volumes). A highly mobile gas should result in fused quartz with fewer bubbles and smaller bubbles than we would have from fusing under a less mobile gas. For example, by choosing Helium, one would have a gas with much higher diffusivity than normal air.
4. The oxidation potential of the gas can be chosen by the stoichiometry. Accordingly, the oxygen presence can be controlled to make the gas phase more or less oxidizing. This may have a significant effect on the part of the bubble structure that comes from the organic gas formers in or on the sand grains. This could also affect electrode consumption rate and the oxidation of the crucible surface.
5. The gas or mixed gases can be chosen to satisfy customer requests and/or requirements such that the atmosphere chosen is most favorable for any microdefects in the grown silicon crystal which is produced. For example, a crucible can be made with the nitrogen removed. Knowing that crystal pulling systems with silicon melts will form silicon nitrides or silicon oxynitrides which would then be incorporated into the growing silicon crystal, preparing a crystal without any nitrides or oxynitrides may be advantageous to crystal pulling and to the crystal product.

EXAMPLES

Crucibles (22" and 24") were manufactured in an apparatus of FIG. 1 under a controlled atmosphere of $N_2+O_2$ with very little argon. Crucibles (22") were manufactured under nitrogen plus oxygen mix (with no argon) and achieved residual fractions of argon ranging from 0.352 to 0.014 for the test 22" crucibles. This residual fraction being the fraction which relates the argon level in gas environment for the test piece versus the argon level in a normal air environment. Crucibles (24") were made under similar nitrogen plus oxygen mixes with little or no argon present so the argon residual fraction could be determined. Argon residual fractions of 0.117 to 0.011 were found. Test crucibles under helium were also manufactured which showed that the presence of helium allows the size of the bubbles in the inner surface volume of the crucible to be reduced. Sample pieces from these test crucibles were vacuum sealed to simulate Czochralski's crystal pulling and it was found that the bubbles exhibited much less growth in size than bubbles containing normally captured air.

This invention has been described with reference to a preferred embodiment. Obviously, modifications and alterations will occur to others upon a reading and understanding of the specification. It is intended to include all such modifications and alterations insofar as the come within the scope of the appended claims or the equivalence thereof.

We claim:

1. An apparatus for manufacture of quartz crucibles comprising:

a hollow mold having a bottom wall portion and a side wall portion and defining a hollow space therein, said walls including a plurality of openings to facilitate gas passage therethrough;

a rotatable support of said mold to rotate said mold about a vertical axis;

a vacuum applied through the walls and bottom of said hollow mold to draw the quartz particles against the walls and remove gas;

a shroud surrounding at least a portion of said hollow mold;

at least one gas inlet positioned to provide a gas to a space between said shroud and said hollow mold;

a housing surrounding at least a portion of said shroud and said hollow mold; and at least one gas outlet positioned to exhaust gas which may exit said space between said shroud and the mold.

2. Apparatus according to claim 1, further including a compressed air source in connection with the openings in the mold to permit ejection of crucibles after melting and sintering.

3. Apparatus according to claim 1, including a rotary vacuum connection joint to couple a vacuum line to the hollow mold.

4. Apparatus according to claim 1 wherein the vacuum is less than 75,000 Pa.

5. Apparatus according to claim 1 wherein the vacuum is less than 15,000 Pa.

6. Apparatus according to claim 1 wherein the vacuum is less than 5,000 Pa.

7. Apparatus according to claim 1, including a gas composition analysis apparatus in communication with a vacuum line.

8. Apparatus according to claim 1, wherein said shroud surrounds an outer bottom and side walls and the outer periphery of a top of the hollow mold.

9. Apparatus according to claim 1 further including at least one electric heating member.

10. Apparatus according to claim 1 wherein said housing forms a gas seal with the shroud.

11. Apparatus according to claim 1 wherein said housing comprises a hood.

12. The apparatus according to claim 11 wherein said hood is in sufficiently close proximity to said shroud to facilitate establishing a positive pressure control atmosphere relative to an outside atmosphere.

13. The apparatus according to claim 1 wherein said at least one gas outlet comprises a duct in said housing.

14. The apparatus according to claim 12 wherein said at least one gas outlet comprises a space between said hood and said shroud.

* * * * *